United States Patent [19]

Decker

[11] 4,167,760
[45] Sep. 11, 1979

[54] BI-PHASE DECODER APPARATUS AND METHOD

[75] Inventor: David G. Decker, Sunnyvale, Calif.

[73] Assignee: Ampex Corporation, Redwood City, Calif.

[21] Appl. No.: 891,087

[22] Filed: Mar. 28, 1978

[51] Int. Cl.² ............................................. G11B 5/09
[52] U.S. Cl. ....................................... 360/40; 360/43
[58] Field of Search ................... 360/43, 51, 67, 39, 360/40

[56] References Cited

U.S. PATENT DOCUMENTS

| 3,699,554 | 10/1972 | Jones | 360/43 |
| 3,794,987 | 2/1974 | Walentz | 360/43 |
| 4,012,786 | 3/1977 | McKie et al. | 360/43 |

Primary Examiner—Vincent P. Canney
Attorney, Agent, or Firm—Robert G. Clay; Ralph L. Mossino; J. Ronald Richbourg

[57] ABSTRACT

The apparatus and method of this invention provides an improved decoder capable of decoding data that has been encoded in accordance with the Bi-phase or Manchester encoding rules, which encoded data may be transmitted over a data channel at varying and various rates. A phase-locked loop circuit, including a phase locked oscillator, phase comparator and missing signal level transition detector, forms an integral part of the decoder apparatus that functions to sample the incoming data at the proper time regardless of the rate of data transmission, and decode the data from the encoded data. Also, a clock signal indicative of the data transmission rate is decoded from the encoded data.

15 Claims, 2 Drawing Figures

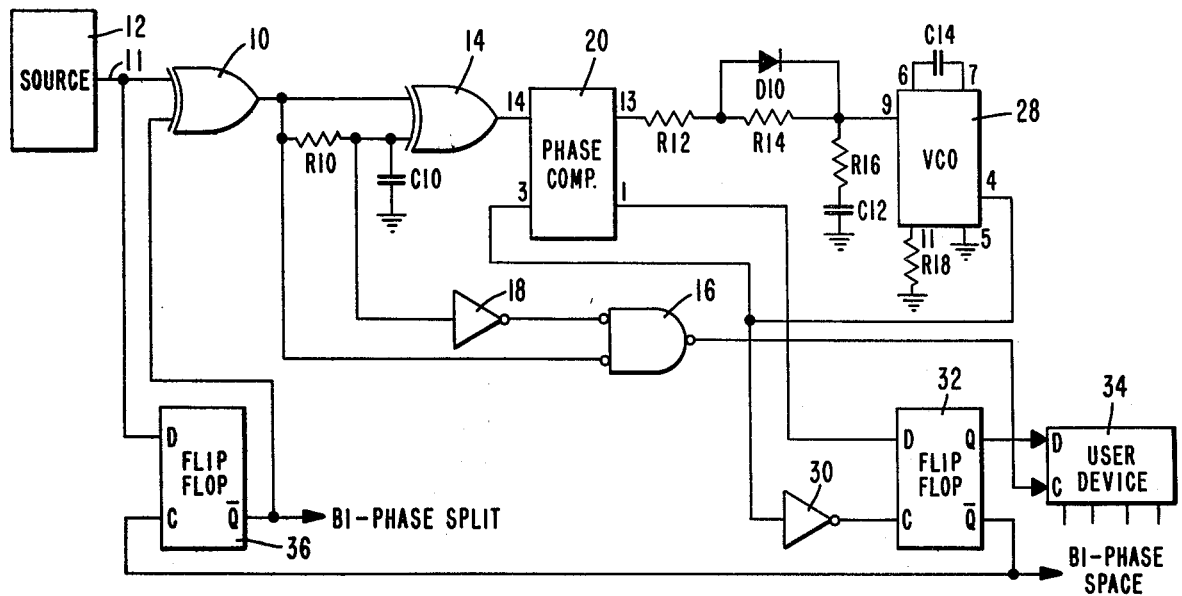
FIG_1
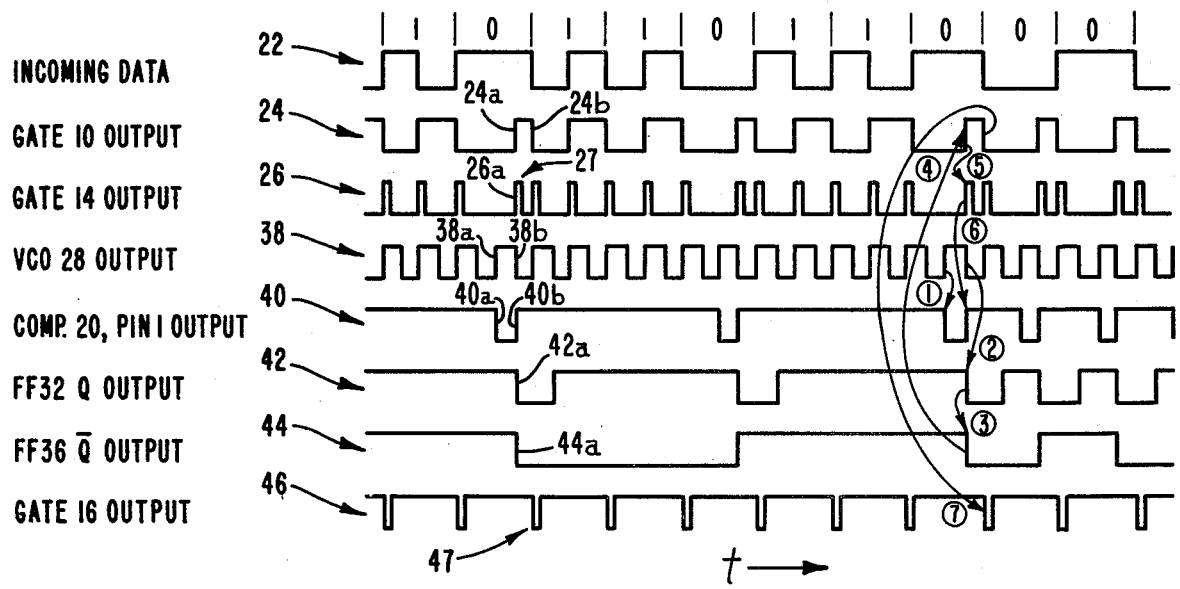
FIG_2

BI-PHASE DECODER APPARATUS AND METHOD

The present invention generally relates to the transmission of data in binary form serially through an information channel, and more particularly to an apparatus for decoding such transmitted data encoded according to a set of encoding rules.

In the field of digital computers and digital data handling devices, coded information is in the form of an electrical signal which periodically represents either one of two digits or logic states. The digits are commonly referred to as the digit "one" and the digit "zero." Clock pulses are also provided in the digital device to periodically determine when, for example, the signal contains significant information. The logic states or digits (also sometimes referred to as data bits) may be recognized or referred to variously as "yes" or "no," "+" or "−," "up" or "down," and "true" or "not true." When the information is recorded on a magnetic medium, the two logic states may be represented as opposite magnetic polarizations. It is also common to have one state a reference level and the other state a different level, in which case indication of the other state may be provided by a recognizable signal while the one state is indicated by the absence of the signal. As is common in digital data processing devices, the principles of this invention can be implemented with positive logic and negative logic. Further, it makes no difference for the purposes of this invention which of the two logic states is called "one" and which is called "zero."

Digital information is seldom transmitted any appreciable distance by the use of a wire for each digit or data bit. In addition, digital information is usually recorded on a magnetic, or other type, of storage medium in a sequential or serial manner for each channel of the digital information. Accordingly, it has long been recognized that such transmitted or recorded digital information be encoded or modulated on a carrier so as to mitigate storage density limitations. There are several known types of information encoding rules. For example, the Miller code as disclosed in U.S. Pat. No. 3,108,261, is self-clocking and provides for at least one transition every two digit periods. A recent improvement over the Miller code is disclosed in U.S. Pat. No. 4,027,335.

Yet another digital data coding technique is the so-called Manchester or Bi-Phase Mark code wherein a digital "one" is represented by a transition, either upward or downward, at mid cell while a digital "zero" is indicated by absence of any transition at mid cell. Conversely, the Bi-Phase Space code represents a digital "zero" by a transition, either upward or downward, at mid cell while a digital "one" is indicated by absence of any transition at mid cell. Accordingly, the decoding or digital information from a signal encoded by the rules of the so-called Manchester code usually require a sampling of the signal level sometime after the mid-cell point (usually at the ¾ cell point). Self-clocking of the digital information encoded in accordance with this code is achieved by introducing a transition at the beginning of each bit cell.

Yet another type of the so-called Manchester code, known also as the Bi-Phase Split code or the Manchester II code, encodes digital data in accordance with the direction of transitions of the digital information signal. A digital "one" is normally represented by a Low-to-high transition, and a digital "zero" is normally represented by a high-to-low transition. A mid-cell transition is required when consecutive digits of the same value are encoded, and no mid-cell transition is required when consecutive digits of opposite polarity are encoded. Thus, it can be seen that it is also necessary to sample the encoded data at the ¾ bit cell point.

There are several known prior art types of decoder circuits adapted for decoding digital information from signals encoded in accordance with the so-called Manchester rules. Each of these decoder circuits have various means for determining the ¾ cell point so as to accurately sample such an encoded signal. One such typical prior art device, which employs a one-shot circuit as a form of time delay to the ¾ cell point, is disclosed in Electronic Design News (EDN) of Apr. 20, 1975, at page 70. By using a one-shot circuit for the time delay, the constituent component values must be changed for each different rate of transmission of the encoded digital information signal. Of course, it should be appreciated that this circuit is unsatisfactory where the encoded signal is being transmitted at a rate, which may change any number of times during a single transmission interval, or which encoded signal must be decoded as the rate of transmission is varying.

Other types of decoder circuits have been developed that would overcome the rate variation limitation. For example, a counter circuit operative at various speeds has been used to provide the necessary time delay to determine the sample time. Also, an analog ramp generator circuit has been used to provide this time delay. These prior art decoder circuits have the disadvantage of being large, cumbersome and require large amounts of power for operation.

Briefly stated, the present invention provides an apparatus for decoding digital information from a signal encoded in accordance with bi-phase coding rules, whereby the digital information is represented by the presence and absence of signal level transitions at boundary and mid-cell locations of a sequence of data cell intervals occurring at a data clock rate. The apparatus typically comprises oscillator means for generating a clock signal at a frequency of two times the data clock rate; phase comparator means coupled to receive the clock signal generated by the oscillator means and the encoded signals for providing an output result signal representative of the phase relationship between the clock signal and the encoded signal, the oscillator means responsive to the output result signal to generate the clock signal at a corresponding phase and frequency; means responsive to the absence of a mid-cell transition in the encoded data for causing a signal level inversion in the encoded data coupled to the input of the phase comparator means, the inversion effected before the termination of the cell interval from which the transition is absent; and means responsive to the oscillator means and the encoded data for providing decoded data from the apparatus.

As stated herein, the decoder apparatus of this invention decodes data transmitted at various and varying rates. A phase-locked oscillator is employed for controlling a data decoder means. A phase-locked loop is sensitive to changes in the data transmission rate to adjust the associated phase-locked oscillator to a corresponding frequency and phase. In decoders for processing fixed rate encoded data, the phase locked oscillator is typically synchronized by the transitions included in the encoded data. The fixed rate data decoders do not require regularly occurring encoded data transitions to maintain the required synchronization. However, in the variable data rate decoder apparatus of this invention, the irregularly occurring data transitions characteristic of Bi-phase codes could be interpreted as data rate changes. To avoid the effect of irregularly occurring data transitions, provision is made to inject a pulse in synchronization with the data within a fraction of a bit cell interval before the next succeeding bit cell time interval whenever a signal level transition does not occur in the bit cell interval at a location at which transitions are permitted to occur. In its most preferred embodiment, means are provided for inverting the level of the encoded data signal when a mid-cell transition does not occur in the encoded data. This preferred embodiment assures the desires synchronization of the injected pulse with the encoded data.

The apparatus of the present invention also can be employed to detect the absence of signal level transitions from spaced locations in a signal containing a series of signal level transitions, which signal may be transmitted at different and varying signal rates. The above-described phase comparator means, signal level inversion means and oscillator means cooperate to detect and provide an indication of absent signal level transitions.

In addition, the present invention provides a method of decoding digital information from a signal encoded in accordance with Bi-phase coding rules, the method comprising the steps of producing pulses in response to each transition of the encoded signal; generating an oscillatory signal by means of a phase-locked loop operative in response to the pulses; comparing the phase relationship of the pulses with the oscillatory signal; providing a result signal indicative of the phase comparison; periodically storing the result signal as a representation of the digital information decoded from the encoded signal; and, inverting the level of the encoded signal in the absence of a mid-cell transition of the encoded signal.

It is an object of this invention to provide a circuit and method for decoding data transmitted over an information channel.

Another object of this invention is to provide a circuit and method for decoding data transmitted at various and varying rates, which data has been encoded by the Bi-Phase coding rules.

A further object of this invention is to detect the absence of signal level transitions in a signal that is transmitted through a data channel at different signal transmission rates.

Other objects, features and advantages of the present invention will become clear from the following detailed descriptions, particularly when taken in conjunction with the appended drawing in which:

FIG. 1 is a schematic diagram of the decoder circuit of this invention; and,

FIG. 2 is a timing diagram illustrating operation of the circuit shown in FIG. 1.

Referring now to the drawings, and FIG. 1 in particular, a schematic diagram of the decoding apparatus of this invention is shown. The incoming data, which has been encoded in accordance with the rules of the Manchester code, also known as Bi-phase, is applied to the first of two input terminals of an exclusive OR gate 10 from a source 12 over a line 11. Source 12 may typically comprise a magnetic storage medium, such as a magnetic tape recorder/reproducer. Data encoded by the rules of the Manchester code contain not only the data but the clock signals for the data as well. It is, therefore, the function of the decoder apparatus embodiment of this invention illustrated in FIG. 1 to decode data encoded by rules of the Manchester code, which encoded data may be transmitted by the source 12 at varying and various data rates. It is also the function of this decoder to decode the clock signals associated with the incoming encoded data.

The output terminal of the exclusive OR gate 10 is coupled to the first of two input terminals of another exclusive OR gate 14, to one side of a resistor R10, and to an inverting input terminal of a low level AND gate 16. The second side of the resistor R10 is coupled to the second input of the gate 14, to one side of a capacitor C10, and to an input terminal of an inverter 18. The output of the gate 14 is coupled to one of two input terminals of a phase comparator 20. The second side of the capacitor C10 is coupled to ground potential, and the output terminal of the inverter 18 is coupled to the second inverting input terminal of the low level AND gate 16.

The resistor R10 and the capacitor C10 form an integrator circuit disposed for delaying briefly the signal transitions at the output of the gate 10, which delayed signal transitions are applied to the second input terminal of the gate 14. The combination of the delayed and undelayed outputs of the gate 10 being applied simultaneously to the two inputs of the gate 14 produces short pulses at the output of the gate 14. These short pulses are thus produced for each transition of the signal at the output of the gate 10, which short pulses occur at a frequency of twice the one's frequency of the Manchester encoded data as will be explained further hereinbelow.

Referring briefly to FIG. 2, wherein a timing diagram of the operation of the circuit shown in FIG. 1 is illustrated, waveform 22 represents the incoming data encoded by the Manchester code rules with the bit cell boundaries and the status of the individual data bits identified above this waveform. Assuming that the waveform 22 represents a Bi-Phase Mark encoded signal, note that there is no mid-cell transition for a "zero" data bit and a single transition at mid cell for a "one" data bit. The opposite would be true if the waveform 22 represented a Bi-Phase Space encoded signal. However, if the waveform 22 represented a Bi-Phase Split encoded signal, the digits encoded would be 11000111010.

Waveform 24 represents the signal appearing at the output of the exclusive OR gate 10 as a function of waveform 22 and another signal applied to the second input of this OR gate which will be explained in greater detail hereinbelow. Waveform 26 represents the pulses appearing at the output of the exclusive OR gate 14, which as may be seen from the diagram occur twice for each data bit cell as indicated above the waveform 22, which corresponds to the number of permissible signal level transitions athat can occur within each bit cell interval. That is, the pulses represented by the waveform 26 have a frequency twice the maximum one's frequency of the Manchester encoded data.

With reference again to FIG. 1, a first output terminal of the comparator circuit 20 at pin 13 is coupled to an input terminal of a voltage controlled oscillator (VCO) 28 through a pair of series coupled resistors R12 and R14, respectively. A diode D10 is coupled in parallel with the resistor R14, and the input terminal of the VCO 28 is also coupled to ground potential through a series-connected resistor-capacitor network comprising a resistor R16 and a capacitor C12. The network comprising the resistors R12, R14, and R16, the diode D10 and the capacitor C12 form a low-pass filter which integrates the output signal from the phase comparator 20. The arrangement of the resistors R12 and R14 with the diode D10 in parallel with the resistor R14 has the effect of providing a short pull up time of pin 9 of the VCO when the outpin pin 13 of the phase comparator makes a high transition, while providing a long pull down time when the output pin 13 makes a low transition. With this arrangement, a detected phase error at the outputs of the phase comparator will have only a slight change in the VCO operation when low transitions occur at the outputs of the phase comparator upon the occurrence of a "zero" data bit at the comparator's input.

The phase comparator 20 and the VCO 28 may typically comprise a single integrated circuit, as for example, a Phase-Locked Loop circuit, Model No. 14046 manufactured by Motorola Semiconductor Products, Inc. Further details of a phase-locked loop circuit, such as the Model No. 14046, may be had by reference to a manual published by Motorola entitled McMOS Integrated Circuits, Vol. 5, Series A, 1975 at pages 7–124, et seq. The low-pass filter is external to the integrated circuit, and selection of the individual component values will be described further hereinbelow. The pin numbers associated with the integrated circuit are standard in the industry for such a phase-locked loop and are set forth in FIG. 1 adjacent the phase comparator 20 and the VCO 28 for reference purposes only.

In this embodiment of the invention, a capacitor C14 is coupled between pins 6 and 7 of the VCO 28, a resistor R18 is coupled between pin 11 of the VCO and ground potential, and pin 5 is coupled directly to ground potential. The output pin 4 of the VCO is coupled back to the second input (pin 3) of the phase comparator, and to the input terminal of an inverter 30. In operation, the phase comparator 20 compares the time of occurrence of pulses received on the two input pins 3 and 4 thereof, detects whether there is any phase difference in these pulses, and provides output signals representative of this comparison operation. In particular, the output of thephase comparator 20 at pin 13 is a high impedance at all times except when a phase difference between the data and VCO pulses is detected at the input of the phase comparator. If the pulses applied to pin 14 are advanced in phase with respect to the pulses applied to pin 3 of the comparator, a high-level signal or pulse is provided on the output pin 13 and a low-level signal or pulse is provided on the output pin 1. Conversely, if the pulses applied to pin 3 are advanced in phase with respect to the pulses applied to pin 14 of the comparator, low-level signals are provided on both output pins 1 and 13. If the the input pulses are in phase (i.e., they occur at the same time) pin 13 of the comparator is at a high impedance and a higl-level signal is provided at the output pin 1. The duration of the above-described low-level and high-level signal conditions at pin 13 of the phase comparator 20 corresponds to the time difference between the occurrences of the data and VCO pulses at the input of the phase comparator. An example of this is illustrated in FIG. 2 by waveforms 26, 38 and 40 and, in particular, the spacing of pulse edges 40a and 40b of waveform 40.

A high-level signal at the output pin 13 of the comparator 20 will produce an increasing voltage on the input pin 9 of the VCO 28, which will increase the frequency of oscillation of the VCO to thereby establish an exact phase relationship between the two compared pulses. Conversely, a low-level signal at the output pin 13 of the comparator will produce a decreasing voltage on the input pin 9 of the VCO, which will decrease the frequency of oscillation of the VCO. Finally, a high impedance condition at pin 13 of the comparator, as when the pulses are in phase, will maintain the frequency of oscillation of the VCO 28. Accordingly, it can be seen that the phase relationship of the pulses from the VCO is maintained in step with the phase of the pulses applied to pin 14 of the phase comparator 20.

The pin 1 output of the comparator 20 is coupled to the data (D) input terminal of a flip-flop 32, and the output terminal of the inverter 30 is coupled to the clock (C) input terminal of this same flip-flop. The true output terminal of the flip-flop 32 is the data output of the decoder circuit and is shown coupled to an exemplary user device such as a shift register 34. The true output terminal of the flip-flop 32 provides the decoded data if the data from the source 12 is encoded in accordance with the Bi-Phase Mark rules, and the not-true output of this flip-flop provides a decode of Bi-Phase Space encoded data.

The output terminal of the low level AND gate 16, which transmits the clock output signal of the decoded Manchester encoded data from the decoder circuit, is coupled to the clock (C) input terminal of the shift register 34. Though the exemplary user device is shown as being a shift register, it is understood that other such user devices may be employed with the decoder circuit of this invention. Furthermore, as is apparent from waveforms 38 and 42 of FIG. 2, the decoded data provided by either flip-flops 32 and 36 can be converted to the common NRZ form in which a high level signifies a "one" data bit and a low level a "zero" data bit by strobing the provided data with the clock signal provided by the low level AND gate 16.

The not-true output terminal of the flip-flop 32 is coupled to the clock (C) input terminal of another flip-flop 36. The not-true output terminal of the flip-flop 36 is coupled to the second input terminal of the exclusive OR gate 10, and the data (D) input terminal of this same flip-flop is coupled to the input line 11. Thus, each change of the flip-flop 32 to a reset state (i.e., the not-true output of 32 going to a high level) will clock the instantaneous level on the line 11 into the flip-flop 36. If the digital information being transmitted from the source 12 is encoded in accordance with the Bi-Phase Split rules, the decode of this information is provided at the not-true output terminal of the flip-flop 36. In addition, a change in state of the flip-flop 36 will effect a level inversion of the encoded data signal by the exclusive OR gate 10 as will be described further hereinbelow.

Referring again to the timing diagram of FIG. 2, waveform 38 represents the signal provided at the pin 4 output terminal of the VCO 28. Waveform 40 represents the signal provided at the pin 1 output terminal of the phase comparator 20, and waveform 42 represents the output data signal appearing at the true output terminal of the flip-flop 32. That is, waveform 42 represents an NRZ (non-return to zero) format of data decoded by the decoder apparatus of this invention from the Bi-Phase Mark encoded data supplied from the source 12. Waveform 44 represents the signal appearing at the not-true output terminal of the flip-flop 36; and waveform 46 represents the signal appearing at the output terminal of the low level AND gate 16, which signal comprises the clock signal associated with the incoming Bi-Phase encoded data and which has been decoded by the apparatus of this invention.

In operation, the decoder apparatus shown in FIG. 1 will provide a low-level signal at the true output of the flip-flop 32 for a decoded "zero" data bit if the incoming data is encoded in accordance with the Bi-Phase Mark code rules. For decoding a "one" data bit the pin 1 output of the comparator circuit provides a high-level signal at the data (D) input terminal of the flip-flop 32, which high-level signal is clocked into this flip-flop by the signals at the pin 4 output terminal of the VCO 28 (waveform 38) through the inverter 30. However, decoding of a zero data bit is effected by the phase comparator indicating an error condition by the absence of a pin 14 input pulse (waveform 26) compared with a positive transition of the VCO output signal (waveform 38). The occurrence of a zero data bit is reflected in the input data by the absence of a signal level transition at the mid-cell location of the permitted locations in the data cell interval for signal level transitions. In particular, note at edge 38a of the waveform 38 that there is no corresponding one of the pulses of the waveform 26 since this is a "zero" data bit of the Bi-Phase Mark encoded data. At this time, the output pin 1 of the comparator 20 drops to a low level as indicated by edge 40a of the waveform 40, and at the next succeeding negative transition of the waveform 38, at edge 38b, the true output of the flip-flop 32 drops to a low level at edge 42a. This provides an indication of the absence of a signal level transition in the input data and a corresponding NRZ zero data bit at the output of the decoder circuit. At substantially the same time that the true output of the flip-flop 32 drops to a low level at edge 42a, the not-true output thereof rises to a high-level. This high-level transition at the not-true output of the flip-flop 32 clocks the instantaneous level of the encoded signal (waveform 22) into the flip-flop 36 (edge 44a of the waveform 44) which changes the level at the second input of the exclusive OR gate 10, thereby inverting the levels of the signal appearing at the output of this gate. This inversion in levels causes a positive transition at the output of the gate 10 at edge 24a of the waveform 24, which will in turn produce at the output of the gate 14 a pulse 27 having a leading edge 26a. A high-to-low transition at the output of the exclusive OR gate 10 (edge 24b of the waveform 24) will also change the output of the low level AND gate 16 to thereby signify the absence of a signal level transition at the mid-cell location of a bit cell interval in the input data and decode an output clock pulse 47 at the proper time. The pulse 27 will again satisfy the phase comparator 20 such that the pin 1 output thereof will rise back to a high level at edge 40b.

Because the output at pin 1 of the phase comparator 20 provides a signal whenever a signal level transition is absent from a permissible signal level transition location in the input data, the apparatus illustrated in FIG. 1 can be employed to detect the absence of signal level transitions from a signal that has transitions located only at equally spaced intervals. Moreover, the apparatus is capable of detecting the absence of signal levels in signals transmitted at varying and different rates. The absent signal level transitions can be detected by monitoring pin 1 of the phase comparator 20 for signal pulses, such as illustrated by waveform 40 in FIG. 2.

Alternatively, the true output of flip-flop 32 can be monitored for pulses (waveform 42 in FIG. 2) signifying absent signal level transitions. Monitoring the true output of flip-flop 32 has the advantage of isolating the detection of absent signal level transitions from signal level changes that occur at pin 1 of the phase comparator 20 at times other than when a signal level transition is absent from the input signal.

The above-described sequence of operation is summarized in the right-hand portion of FIG. 2 by sequence-direction indicating arrows accompanied by sequence-step numbers. It should be understood that there is an accompanying circuit propagation time delay between each of the sequence steps which has been omitted for clarification of the drawings.

As stated hereinabove, for the Bi-Phase Mark encoded signal, a transition is made at mid cell for a "one" data bit and there is no mid cell transition for a "zero" data bit. To determine whether there is a "one" or "zero" data bit in a particular cell, a sample must be made at some time after the mid-cell point (usually at the ¾ cell point). This is also a requirement for decoding Bi-Phase Space and Bi-Phase Split encoded data. It should be appreciated that there is a single transition per bit cell (at the cell boundary) for a "zero" data bit, and two transitions per bit cell for a "one" data bit. Further, note in waveform 38 that there are four transitions per bit cell at the output of the VCO 28. The third transition of the VCO output signal (e.g., edge 38b of the waveform 38) is the ¾ cell time, and is the time at which the pin 1 output of the phase comparator 20 is clocked into the flip-flop 32 (i.e., the sample time).

As alluded to hereinabove, the decoder circuit of this invention is operative at various and varying speeds of the encoded data transmitted over a data channel. To this end, the values of the individual components were selected as indicated below.

R10 = 1 KOhms
R12 = 30 KOhms
R14 = 120 KOhms
R16 = 1.8 KOhms
R18 = 10 KOhms
C10 = 220 pico Farads
C12 = 0.10 micro Farads
C14 = 220 pico Farads The range of operating speed is determined primarily by the speed of the VCO 28 within the phase-locked loop (PLL) integrated circuit. For example, when using a CMOS type PLL, such as the Motorola Model No. MC 14046, data can be decoded from approximately $300 \times 10^3$ Baud (Bits per Second) down to approximately 1200 Baud. If, for example, the PLL integrated circuit were a Motorola Model No. MC 14046B AL, (which is a military standard part) the upper range limit is extended to about $500 \times 10^3$ Baud with the lower range limit remaining the same. These ranges of operation are established with a 10 volt supply to the CMOS type PLL. If, however, the voltage supply were increased to 15 volts, then the upper range limit is extended to about $700 \times 10^3$ Baud with the lower range limit remaining the same. The upper range limit can be further extended to approximately $7.5 \times 10^6$ Baud if the PLL were of the transistor-transistor logic (TTL) family type, or up to about $40 \times 10^6$ Baud if the PLL were of the emitter-coupled logic (ECL) family type.

Accordingly, a decoder apparatus and method has been described for decoding data transmitted over an information channel, which transmitted data has been encoded by the rules for the Manchester code. The decoder apparatus of this invention has the unique feature of being able to decode such encoded data that is transmitted at various and varying speeds over an information channel. The encoded data is uniquely sampled at the ¾ cell time by the use of a phase-locked loop forming an integral part of the decoder apparatus. Further, clock pulses associated with the encoded data are decoded by the apparatus of this invention. Also, the apparatus of this invention can be employed to detect signal level transitions that are absent from spaced locations of an information signal formed of a series of signal level transitions.

Though the present invention has been described in detail with reference to a specific embodiment, it is understood that various changes and modifications may be made in the above-described decoder apparatus and method without departing from the spirit or scope of the present invention. It is, therefore, intended that the invention herein described be limited only by the appended claims.

I claim:

1. An apparatus for decoding digital information from a signal encoded in accordance with bi-phase coding rules whereby the digital information is represented by signal level transitions at boundary and mid-cell locations of a sequence of data cell intervals occurring at a data clock rate comprising:
    oscillator means for generating a clock signal frequency of two times the data clock rate;
    phase comparator means coupled to receive the clock signal generated by the oscillator means and the encoded signals for providing an output result signal representative of the phase relationship between the clock signal and the encoded signal, said oscillator means responsive to the output result signal to generate the clock signal at a corresponding phase and frequency;
    means responsive to the absence of a mid-cell transition in the encoded data for causing a signal level inversion in the encoded data coupled to the input of said phase comparator means before the termination of the data cell interval from which the transition is absent; and,
    means responsive to said oscillator means and the encoded data for providing decoded data from said apparatus.

2. An apparatus as in claim 1 further characterized by said means responsive to the absence of a mid-cell transition being operative to hold said signal level inversion until a subsequent absence of a transition in a cell interval is detected.

3. An apparatus for decoding digital information from a signal including one digits and zero digits encoded in accordance with bi-phase coding rules comprising:
    means for producing pulses in response to each transition of the encoded signal, said means for producing pulses having a first input terminal disposed for receiving the encoded signal, a second input terminal and first and second output terminals;
    circuit means disposed for detecting phase changes of said pulses and having a first input terminal coupled to said first output terminal of said means for producing pulses, a first output terminal disposed for providing an oscillatory signal and a second output terminal disposed for providing a result signal indicative of the phase relationship of said pulses and said oscillatory signal;
    storage means having a data input terminal coupled to said second output terminal of said circuit means and a clock input terminal coupled to said first output terminal of said circuit means, and having an output terminal disposed for providing decoded data from said apparatus; and,
    means for inverting the level of the encoded signal when a zero digit is decoded from said encoded signal, said means for inverting being coupled between said output of said storage means and said second input terminal of said means for producing pulses.

4. An apparatus as in claim 3 further characterized by a gating means having an input terminal coupled to said second output terminal of said means for producing pulses and an output terminal disposed for providing decoded clock signals associated with said encoded signal.

5. An apparatus as in claim 3 further characterized by said circuit means comprising a phase-locked loop circuit including a phase comparator circuit having a first output terminal disposed for providing a second phase comparison result signal and a second output terminal forming said second output terminal of said circuit means.

6. An apparatus as in claim 5 further characterized by said circuit means including a voltage controlled oscillator having an input terminal coupled to said first output terminal of said phase comparator circuit and an output terminal forming said first output terminal of said circuit means.

7. An apparatus as in claim 6 further characterized by circuit means including filter means coupled between said first output terminal of said phase comparator circuit and said input terminal of said voltage controlled oscillator.

8. An apparatus as in claim 3 further characterized by said means for inverting including a second storage means coupled between said storage means and said means for providing pulses such that said encoded signal being at a first level in response to a first state of said second storage means and at an inverted level in response to a second state of said second storage means and said second storage means being set at said second state in response to a zero digit decoded by said apparatus from said encoded signal.

9. A method of decoding digital information from a signal encoded in accordance with bi-phase coding rules whereby the digital information is represented by signal level transitions at boundary and mid-cell locations of a sequence of data cell intervals, said method comprising the steps of:
    producing pulses in response to each transition of the encoded signal;
    generating an oscillatory signal by means of a phase-locked loop operative in response to said pulses;
    comparing the phase relationship of said pulses with said oscillatory signal;
    providing a result signal indicative of said phase comparison;
    periodically storing said result signal as a representation of the digital information decoded from said encoded signal; and,
    inverting the level of the encoded signal in the absence of a mid-cell transition of said encoded signal.

10. A circuit for decoding a data signal encoded in accordance with bi-phase coding rules whereby the digital information is represented by signal level transitions in a sequence of data cell intervals, said circuit comprising:

means for producing pulses for each transition of the encoded data signal, said means for producing having a first input terminal disposed for receiving the encoded data signal, a second input terminal and first and second output terminals;

phase comparison means having a first input terminal coupled to said first output terminal of said means for producing, a second input terminal disposed for receiving a signal to be phase compared with pulses from said means for producing pulses, and first and second output terminals disposed for providing signals indicative of the result of the phase comparison;

means for generating an oscillatory signal in response to signals from said first output terminal of said phase comparison means, and having an output terminal coupled to said second input terminal of said phase comparison means;

a first storage means having a data input terminal coupled to said second output terminal of said phase comparison means, a clock input terminal coupled to said output of said means for generating, and first and second output terminals;

second storage means having a clock input terminal coupled to said second output terminal of said first storage means and an output terminal coupled to said second input terminal of said means for producing pulses; and gating means having an input terminal coupled to said second output terminal of said means for producing pulses, and an output terminal disposed for providing clock pulses decoded from said encoded data signal.

11. Apparatus for detecting the absence of signal level transitions from spaced locations of an information signal comprising:

input means adapted to be coupled to receive said information signal;

oscillator means for generating a clock signal;

synchronization means coupled to said input means and said oscillator means for maintaining the clock signal and the information signal in phase and frequency locked synchronism;

signal generating means coupled to said oscillator means and responsive to said clock signal for generating a signal indicative of the absence of a signal level transition in said information signal at and for an interval following a spaced location in the information signal; and means coupled to said signal generating means and responsive to said signal indicative of an absent signal level transition for producing at the synchronization means the effect of the presence of a signal level transition in the information signal, said effect of the presence of a signal level transition produced prior to the occurrence of the location in the information signal next following said location from which the signal level transition is absent.

12. Apparatus according to claim 11 wherein the means for producing the effect of the presence of a signal level transition in the information signal is a signal inverter means coupled between the input means and synchronization means for inverting the level of the information signal.

13. Apparatus for detecting the absence of signal level transitions from equally spaced locations of an information signal comprising: input means adapted to be coupled to receive said information signal;

oscillator means for generating a clock signal at a frequency corresponding to the frequency of said spaced locations of the information signal, said clock signal in the form of signal level transitions;

phase comparator means coupled to said input means and said oscillator means for generating a result signal representative of the phase relationship of the clock signal and the information signal, said result signal having a signal state condition indicative of the absence of a signal level transition at a spaced location of the information signal, said oscillator means responsive to said result signal to generate said clock signal in phase and frequency locked synchronism with said information signal;

signal generator means coupled to said oscillator means for generating a signal indicative of an absent signal level transition in said information signal in response to the occurrence of a selected signal level transition of said clock signal following the onset of the signal state condition of said result signal and of the absence of a signal level transition in said information signal during said signal state condition; and signal level inverter means coupled between the input means and the phase comparator means for inverting the level of the information signal in response to said signal indicative of an absent signal level transition.

14. Apparatus according to claim 13 wherein said signal generator means includes storage means coupled to said phase comparator means and to said oscillator means for storing the signal state condition of said result signal in response to the occurrence of said selected signal level transition of said clock signal, said storage means coupled to said signal level inverter means to provide the signal indicative of an absent signal level transition.

15. Apparatus for decoding a digital information signal containing digital data in a sequence of data cells and encoded in accordance with coding rules whereby the digital data are represented by the presence and absence of signal level transitions at two locations within the data cells comprising:

input means adapted to be coupled to receive said digital information signal;

oscillator means for generating a clock signal at a frequency of two times the data cell rate;

synchronization means coupled to said input means and said oscillator means for maintaining the clock signal and the digital information signal in phase and frequency locked synchronism;

means coupled between said input means and said synchronization means and responsive to the absence of a signal level transition at a data cell location for inverting the level of the digital information signal prior to the occurrence of the signal level transition location following said location from which the signal level transition is absent; and means coupled to said oscillator means and said input means and responsive to the clock signal digital information signal for providing decoded digital data.

* * * * *